US012802416B2

(12) United States Patent
Yoo et al.

(10) Patent No.: US 12,802,416 B2
(45) Date of Patent: Nov. 17, 2026

(54) DEVICE AND METHOD FOR LIGHTENING ARTIFICIAL INTELLIGENCE-BASED GENERATIVE MODEL

(71) Applicant: UNIST (ULSAN NATIONAL INSTITUTE OF SCIENCE AND TECHNOLOGY), Ulsan (KR)

(72) Inventors: Jaejun Yoo, Ulsan (KR); Sangyeop Yeo, Ulsan (KR); Yoojin Jang, Ulsan (KR); Jy Yong Sohn, Seoul (KR); Dongyoon Han, Seoul (KR)

(73) Assignee: UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 219 days.

(21) Appl. No.: 18/811,068

(22) Filed: Aug. 21, 2024

(65) Prior Publication Data

US 2025/0037440 A1 Jan. 30, 2025

Related U.S. Application Data

(63) Continuation of application No. PCT/KR2023/019262, filed on Nov. 27, 2023.

(30) Foreign Application Priority Data

Jul. 28, 2023 (KR) ........................ 10-2023-0099154

(51) Int. Cl.

| | |
|---|---|
| ***G06V 10/776*** | (2022.01) |
| ***G06N 3/084*** | (2023.01) |
| ***G06V 10/82*** | (2022.01) |

(52) U.S. Cl.

CPC ............ *G06V 10/776* (2022.01); *G06V 10/82* (2022.01)

(58) Field of Classification Search

CPC ... G06T 7/50; G06T 7/73; G06T 2207/10028; G06T 2207/30252; G06T 2207/10016;

(Continued)

(56) References Cited

U.S. PATENT DOCUMENTS

2021/0374756 A1* 12/2021 Pandey ................ G06N 3/0475

FOREIGN PATENT DOCUMENTS

| | | |
|---|---|---|
| CN | 112860411 A | 5/2021 |
| KR | 10-2023-0073608 A | 5/2023 |

OTHER PUBLICATIONS

Vivek Ramanujan et al; "What's Hidden in a Randomly Weighted Neural Network?"; 2020 IEEE/CVF Conference on Computer Vision and Pattern Recognition (CVPR); Aug. 5, 2020; pp. 11890-11899.

(Continued)

*Primary Examiner* — Siamak Harandi

(74) *Attorney, Agent, or Firm* — Studebaker Brackett PLLC

(57) ABSTRACT

Disclosed is a device for lightening an artificial intelligence-based generative model including a memory that stores data for lightening the artificial intelligence-based generative model and a processor that perform operations related to lighten the generative model. The processor assigns a randomly initialized score(s) to each of weights for a dense network based on an edge-popup algorithm, finds a random subnetwork, sorts the assigned scores in each forward path, and updates the scores using backpropagation, while leaving a weight with a preset top k % score.

13 Claims, 9 Drawing Sheets

(58) Field of Classification Search
CPC G06T 7/55; G06T 7/521; G06F 17/17; G06V 10/80; G06V 10/776; G06V 10/82; G06N 3/0475; G06N 3/0495; G06N 3/08; G06N 3/096; G06N 3/084
See application file for complete search history.

(56) References Cited

OTHER PUBLICATIONS

Neha Mukund Kalibhat et al.; "Winning Lottery Tickets in Deep Generative Models"; The Thirty-Fifth AAAI Conference on Artificial Intelligence (AAAI-21); Feb. 2021; pp. 8038-8046.
Chun-Liang Li et al.; "MMD GAN: Towards Deeper Understanding of Moment Matching Network"; Advances in Neural Information Processing Systems 30 (NIPS 2017); Dec. 2017; pp. 1-11.
Sangyeop Yeo et al.; "Can We Find Strong Lottery Tickets in Generative Models?"; arXiv:2212.08311v1, Dec. 2022 / [search date: Apr. 3, 2024]; URL<https://arxiv.org/pdf/2212.08311v1.pdf>; pp. 1-18.
Sangyeop Yeo et al.; "Can We Find Strong Lottery Tickets in Generative Models?"; Proceedings of the Thirty-Seventh AAAI Conference on Artificial Intelligence (AAAI-23), Article No. 364; Feb. 2023; pp. 3267-3275.
International Search Report issued in PCT/KR2023/019262; mailed Apr. 12, 2024.

* cited by examiner $$s_{t+1,uv} = s_{t,uv} - \alpha \frac{\partial L}{\partial I_v} \omega_{uv} \rho(I_u)$$

t : Time step
α : Learning rate
L : Loss
$I_u$ : Node input $_u$
ρ: Activation function

DEVICE AND METHOD FOR LIGHTENING ARTIFICIAL INTELLIGENCE-BASED GENERATIVE MODEL

CROSS-REFERENCE TO RELATED APPLICATIONS

The present application is a continuation of International Patent Application No. PCT/KR2023/019262, filed on Nov. 27, 2023, which is based upon and claims the benefit of priority to Korean Patent Application No. 10-2023-0099154 filed on Jul. 28, 2023. The disclosures of the above-listed applications are hereby incorporated by reference herein in their entirety.

BACKGROUND

Embodiments of the present disclosure described herein relate to a device and a method for lightening an Artificial intelligence-based generative model.

State-of-the-art generative models tend to use very large and complex structures for better performance.

However, one drawback of large models is that their application to edge devices such as mobile environments is limited due to the high computing cost for training.

Therefore, there is a need to design new lightweight architectures or new compression methods for generative modeling.

In general, a process of training—pruning—retraining is required to lighten artificial intelligence-based generative models, but additional networks are required due to instability, or additional costs are required due to complex learning processes.

Therefore, there is a need to develop technology capable of stably compressing an artificial intelligence-based generative model and lightening the artificial intelligence-based generative model without degrading performance.

SUMMARY

Embodiments of the present disclosure provide a device and a method for lightening an Artificial intelligence-based generative model through subnetworks, which stably compress the generative model and lighten the generative model without degrading performance by using a subnetwork (strong lottery tickets, SLTs) algorithm for reliably finding the same network as a trained generative model among subnetworks.

The problem to be solved by the present disclosure is not limited to the above-mentioned problem, and the problems not mentioned herein will be clearly understood by those skilled in the art from this specification and the accompanying drawings.

According to an embodiment, a device for lightening an artificial intelligence-based generative model includes a memory that stores data for lightening the artificial intelligence-based generative model and a processor that performs operations related to lightening of the generative model, and the processor may assign a randomly initialized score(s) to each of weights for a dense network based on an edge-popup algorithm, find a random subnetwork, sort the assigned scores in each forward path, and update the scores using backpropagation, while leaving a weight with a preset top k % score.

The processor may set other weights to zero while leaving the weight with the preset top k % score, and in a reverse path, calculate a loss of the subnetwork and utilize the backpropagation.

The processor may send an image generated through the subnetwork and a real image to an embedding space to calculate a Maximum Mean Discrepancy (MMD) score when calculating a loss of the subnetwork.

The processor may calculate the MMD score by matching moments of all orders with real samples and fake samples as two sample sets.

The MMD score may be calculated based on <Equation 1> below

[Equation 1]

$$L_{MMD} = \left\| \frac{1}{N}\sum_{i=1}^{N}\left|\Phi(r_i) - \frac{1}{M}\sum_{j=1}^{M}\Phi(f_j)\right\|^2 \cdots \right|$$

where $r_i$ represents the real sample and $f_j$ represents the fake sample.

The processor may use, as a kernel, a Very Deep Convolutional (VGG) network pre-trained for the moment matching.

The processor may find Strong Lottery Tickets (SLTs) by repeatedly performing an operation of updating the MMD score.

The device may further include a communication unit electrically connected to the processor and configured to perform communication with an external device that provides data for lightening the generative model.

According to an embodiment, a method for lightening an artificial intelligence-based generative model, the method being performed by a device, includes assigning a randomly initialized score(s) to each of weights for a dense network based on an edge-popup algorithm, finding a random subnetwork, sorting the assigned scores in each forward path, and updating the scores using backpropagation, while leaving a weight with a preset top k % score.

The updating may include setting other weights to zero while leaving the weight with the preset top k % score, and in a reverse path, calculating a loss of the subnetwork and utilizing the backpropagation.

The updating may include sending an image generated through the subnetwork and a real image to an embedding space to calculating a Maximum Mean Discrepancy (MMD) score when calculating a loss of the subnetwork.

The updating may include calculating the MMD score by matching moments of all orders with real samples and fake samples as two sample sets.

The MMD score may be calculated based on <Equation 1> below

[Equation 1]

$$L_{MMD} = \left\| \frac{1}{N}\sum_{i=1}^{N}\left|\Phi(r_i) - \frac{1}{M}\sum_{j=1}^{M}\Phi(f_j)\right\|^2 \cdots \right|$$

where $r_i$ represents the real sample and $f_j$ represents the fake sample.

The updating may include using, as a kernel, a VGG network pre-trained for the moment matching.

The updating may include finding Strong Lottery Tickets (SLTs) by repeatedly performing an operation of updating the MMD score.

In addition, a computer program stored in a computer-readable recording medium may be further provided to execute the method for implementing the present disclosure.

In addition, a computer-readable recording medium for recording a computer program for executing the method for implementing the present disclosure may be further provided.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
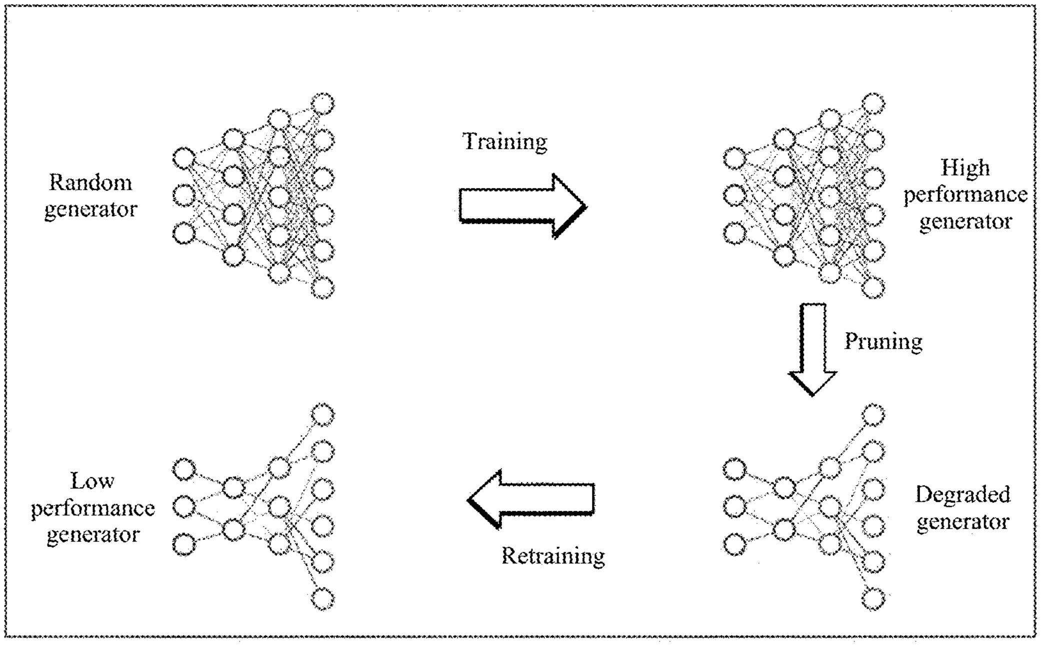
FIG. 1 is a block diagram of an artificial intelligence neural network for describing operation for lightening a general artificial intelligence-based generative model.

Advantages and features of the present disclosure and methods for achieving them will be apparent with reference to embodiments described below in detail in conjunction with the accompanying drawings. However, the present disclosure is not limited to the embodiments disclosed below, but can be implemented in various forms, and these embodiments are to make the present disclosure complete, and are provided so that the present disclosure will be thorough and complete and will fully convey the scope of the present disclosure to those of ordinary skill in the art, which is to be defined only by the scope of the claims.

The terminology used herein is for the purpose of describing particular embodiments only and is not intended to be limiting of the present disclosure. The singular expressions include plural expressions unless the context clearly dictates otherwise. In this specification, the terms "comprises" and/or "comprising" are intended to specify the presence of stated elements, but do not preclude the presence or addition of elements. Like reference numerals refer to like elements throughout the specification, and "and/or" includes each and all combinations of one or more of the mentioned elements. Although "first", "second", and the like are used to describe various components, these components are of course not limited by these terms. These terms are only used to distinguish one component from another. Thus, a first element discussed below could be termed a second element without departing from the teachings of the present disclosure.

Unless otherwise defined, all terms (including technical and scientific terms) used herein have the same meaning as commonly understood by one of ordinary skill in the art to which the present disclosure belongs. Further, unless explicitly defined to the contrary, the terms defined in a generally-used dictionary are not ideally or excessively interpreted.

Like reference numerals refer to like elements throughout the present disclosure. The present disclosure does not describe all elements of the embodiments, and general content in the technical field to which the present disclosure pertains or overlapping content between embodiments are omitted. As used in the specification, the term "unit" or "module" refers to software and a hardware component such as FPGA, or ASIC, and the "unit" or "module" performs certain roles. However, "~unit" or "module" is not meant to be limited to software or hardware. "~unit" or "~module" may be configured to reside in an addressable storage medium or may be configured to reproduce one or more processors. Therefore, "~unit" or "~module" may include components such as software components, object-oriented software components, class components and task components, processes, functions, properties, procedures, subroutines, segments of program codes, drivers, firmware, microcodes, circuitry, data, databases, data structures, tables, arrays, and variables. Components and functionality provided within "units" or "modules" may be combined into a smaller number of components and be further divided into additional components and "units" or "modules".

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

Throughout the specification, a certain member being located "on" another member includes not only a case where the certain member is in contact with another member, but also a case where another member exists between two members.

Terms such as first and second are used to distinguish one component from another component, and the components are not limited by the above-mentioned terms.

As used herein, singular forms may include plural forms as well unless the context clearly indicates otherwise.

In each step, identification symbols are used for convenience of description and the identification symbols do not describe the order of the steps and the steps may be performed in a different order from the described order unless the context clearly indicates a specific order.

The terms used in the following description are defined as follows.

In this specification, the artificial intelligence-based pretrained model is a deep learning-based prediction model, and may generate prediction information by predicting the probability of re-rupture for the surgical site of a patient before or during surgery. Here, the deep learning method is not limited, and at least one method may be applied depending on situations (needs). As an example of an artificial intelligence algorithm, a RNN (Recurrent Neural Network), a transformer, or the like may be applied, but embodiments of the present disclosure is not limited thereto, and other artificial intelligence algorithms may be applied.

Although the description is limited to the 'lightweight device 100' in the present specification, all various devices capable of performing computational processing may be possible as long as the devices are able to lightweight artificial intelligence-based generative model through a server network. That is, the lightweight device 100 may further include a server, a computer, a server and/or a portable terminal, or may take the form of any one of them, but is not limited thereto.

Here, the computer may include, for example, a notebook, desktop, laptop, tablet PC, slate PC, or the like equipped with a web browser.

The server is a server that processes information by communicating with an external device, and may include an application server, a computing server, a database server, a file server, a game server, a mail server, a proxy server, a web server and/or the like.

The portable terminal may be, for example, a wireless communication device that is portable and mobile and may include all types of handheld-type wireless communication devices, such as PCS (Personal Communication System), GSM (Global System for Mobile communications), PDC (Personal Digital Cellular), PHS (Personal Handyphone System), PDA (Personal Digital Assistant), IMT (International Mobile Telecommunication)-2000, CDMA (Code Division Multiple Access)-2000, W-CDMA (W-Code Division Multiple Access), or WiBro (Wireless Broadband Internet) terminals, and wearable devices such as watches, rings, bracelets, anklets, necklaces, glasses, contact lenses, or head-mounted-device (HMD), or the like.

Various companies are conducting a lot of research on not only the pruning technique but also the weight quantization technique as a lightweight technique to service generative models.

Quantization technique is a technique that approximates and expresses weights of the artificial intelligence with less information.

Because commonly used weights are expressed in binary float32 format, 32 bits of information are required for one weight.

The quantization technique has the advantage of efficient use of memory and a large increase in computational speed and reduction in computational complexity by generally approximating a weight to data of 8 bits to express the weight.

However, since the weight is expressed by approximating the weight in the quantization process, there are disadvantages such as a decrease in network performance due to a method of approximating the weight or a necessary for a user to implement additional libraries.

According to the present disclosure, subnetworks are found without training a randomly initialized network, and therefore, final weight distribution of the network is determined without change according to a method of initializing network weights.

In this process, it is not necessary to perform initialization into weight distribution in the float32 format, and the actual performance recorded as a result of the present disclosure may be implemented as binary weights with the network's weight distribution initialized to the kaiming normal constant. In this case, only 3 weights including 0 are used as the weights to be expressed, and therefore, 2 bits may be used to express all the weights of the network.

In addition, unlike existing techniques that require post-processing in the quantization process, the method of the present disclosure may adopt a method of selecting only a subnetwork without updating weights in a network expressed as binary weights, thereby removing a necessity to perform additional post-processing for weight quantization.

Therefore, the present disclosure may not only effectively achieve light-weight through a subnetwork, but also achieve light-weight more than 16 times lighter than a general network and 4 times lighter than a general weight quantization technique, as well as effectively overcome the problem of performance degradation during the quantization process.

Hereinafter, the operating principle and embodiments of the present disclosure will be described with reference to the attached drawings.

FIG. 1 is a block diagram of an artificial intelligence neural network for describing operation for lightening a general artificial intelligence-based generative model.

As shown in FIG. 1, a random network, that is, an untrained model, shows poor performance, and the random network is trained to obtain a high-performance network (trained model). Afterwards, pruning is carried out by proposing specific criteria based on the trained model and removing weights, and the like. In this case, the network structure changes, resulting in a decrease in network performance. To compensate for the decrease, relearning is performed, which ultimately creates a network with low performance.

In other words, as the learning is performed multiple times in the process, the problem of reduced performance is bound to occur.

As described above, existing pruning algorithms have problems such as excessive weight training cost, a decrease in performance, limited generalizability, and complex training.

In order to solve these problems, the present disclosure aims to find SLTs, which are subnetworks that achieve excellent generation performance in the generative model even without weight updates, and in this case, to find SLTs through the moment matching score. Scores are assigned to randomly initialized weights by using the performance of a pre-trained classifier, and a sparse mask is found to ensure that the subnetwork has performance similar to or better than that of a trained dense network (dense network/dense generator).

These SLTs are subnetworks at initialization (i.e., without weight updates), and have performance similar to or better than that of a dense counterpart trained with weights. Here, the edge-popup algorithm is used as the earliest method to find SLTs in the discriminative model. The edge-popup algorithm may select a subnetwork mask based on the idea that it is possible to score the importance of each weight. When the score is assigned, it may be necessary to maintain the weight of the high score according to the desired target sparsity.

Since the performance of the edge-popup algorithm largely depends on the updated score, which serves as the pruning criteria, it is essential to use an appropriate score function for pruning the generative model. It is easy to think of an adversarial loss as a commonly used criterion for training a high-quality generator, but the adversarial loss is very unstable and hinders the search for an appropriate score.

Here, the present disclosure may utilize a statistical hypothesis testing technique known as Maximum Mean Discrepancy (MMD). The technique may derive a simple moment matching score using features extracted from a fixed, pre-trained ConvNet.

That is, the present disclosure may provide a stable algorithm for finding subnetworks with excellent generation performance in a very sparse regime by combining the edge-popup algorithm and the moment matching score. The present disclosure may avoid a tricky issue of balancing the training and the pruning process because no weight updates are required. Additionally, the present disclosure may find SLTs without additional functions, due to the stable characteristics of the moment matching score.

A neural network (z; θ) with a randomly initialized weight θ∈Rd may be generated. Next, the present disclosure may aim to find SLTs. Then, when aiming to find SLTs, the mask m ∈{0, 1} may satisfy that the pruned network G(z; θ⊙m) is performed well in a generative task.

Figure 2:
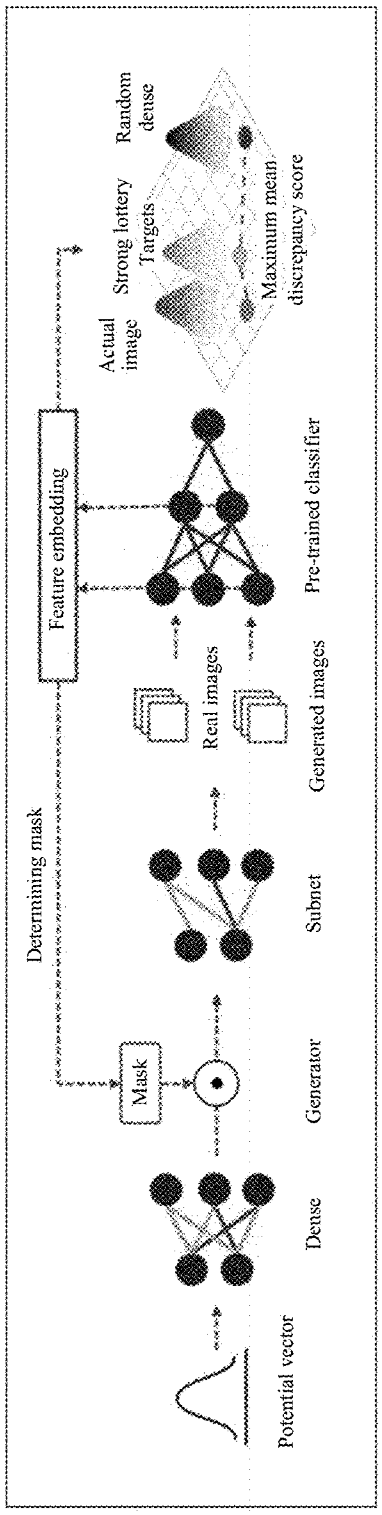
FIG. 2 is a diagram showing a series of operations for lightening an artificial intelligence-based generative model through a subnetwork according to an embodiment of the present disclosure.

FIG. 2 is a diagram showing a series of operations for lightening an artificial intelligence-based generative model through a subnetwork according to an embodiment of the present disclosure.

Referring to FIG. 2, the lightweight device 100 according to an embodiment of the present disclosure may assign a random score to a weight and find a random server network when there is a dense network.

Next, the lightweight device 100 may send generated images and real images to an embedding space to calculate a MMD score, and then update a mask by updating a previously assigned score to continue to update the server network.

In conclusion, it is possible to find SLTs in the generative model without weight updates.

Figure 3:
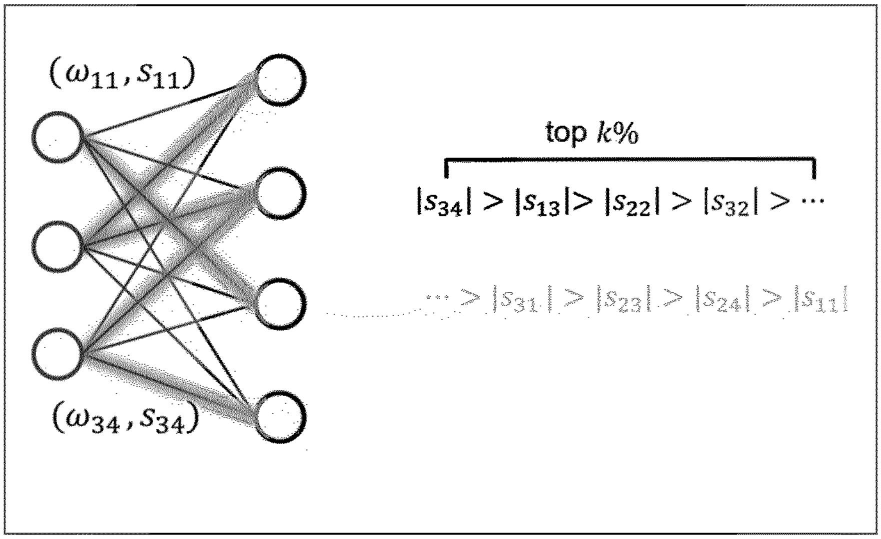
FIG. 3 is a diagram for describing operation of finding SLTs to lighten an artificial intelligence-based generative model through a subnetwork according to the present disclosure.

FIG. 3 is a diagram for describing operation of finding SLTs to lighten an artificial intelligence-based generative model through a subnetwork according to the present disclosure.

As described above, the present disclosure may use the edge-popup algorithm as the earliest method of finding SLTs in a randomized discriminant network. In the edge-popup algorithm. When there are randomly initialized weights (ω), because it is necessary to find which weight of the weights is important, the present disclosure may assign scores "s" for how important the weights are. Specifically, a random score $s_i$ may be assigned to each weight $\theta_i$ ($\theta=[\theta_1, \ldots, \theta_d]$.). In this case, it is assumed that the weight is maintained at k %. Then, in each forward path, the scores $|s_i|$ are sorted in each layer, and $m_i=1$ is assigned if when $|s_i|$ is in the top k % within the corresponding layer and $m_i=0$ is assigned otherwise. For the reverse path, the loss of the network is calculated and the score $s_i$ is updated using back-propagation. Here, the present disclosure may process an indicator function of mapping $s_i$ with mi using a straight-through estimator.

Figure 4:
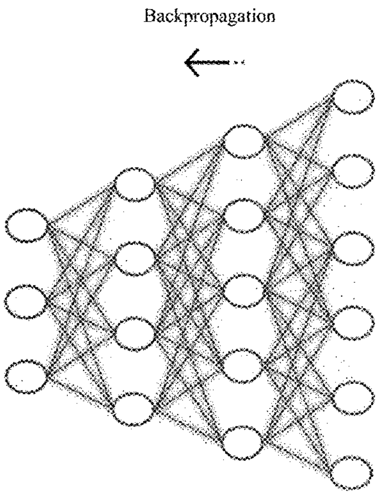
FIG. 4 is a diagram for specifically describing operation of assigning an appropriate score to a weight according to the present disclosure.

FIG. 4 is a diagram for specifically describing operation of assigning an appropriate score to a weight according to the present disclosure.

Meanwhile, in order to assign an appropriate score, the randomly initialized score "s" may be updated using back-propagation. The present disclosure may find the subnetwork of the network, obtain an output of the subnetwork, and update all scores through back-propagation of the output. In other words, it may be expected to find an appropriate score by updating the scores.

Figure 5:
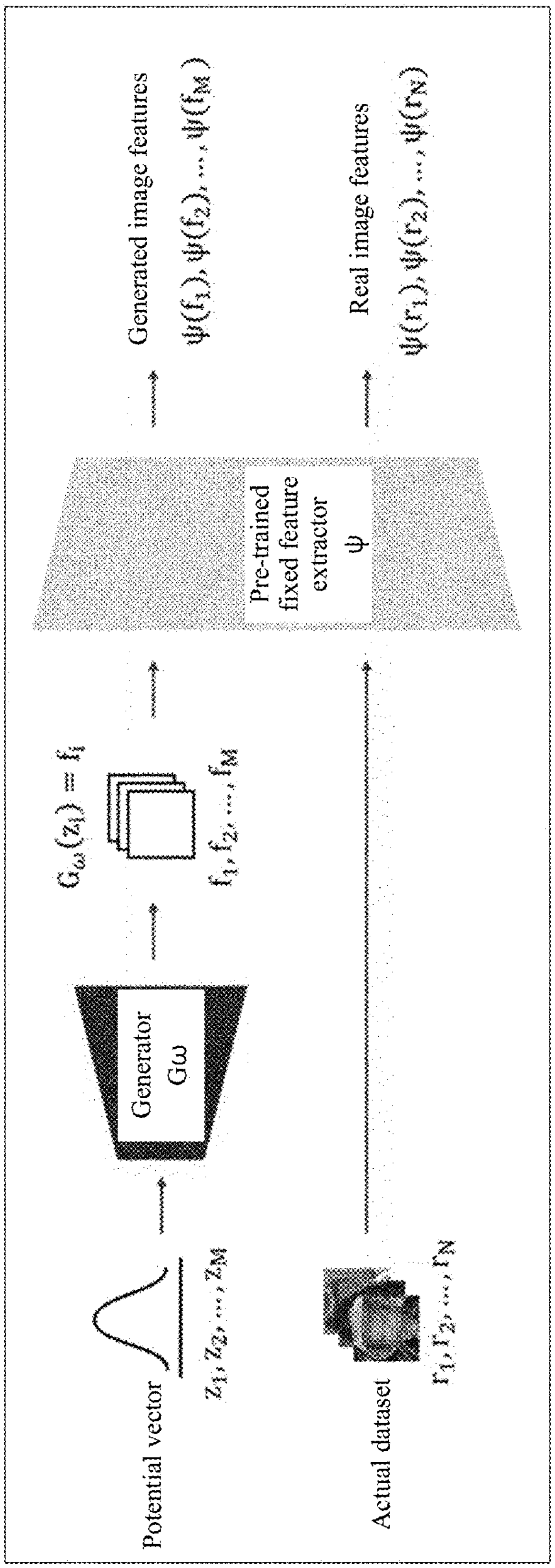
FIGS. 5 and 6 are diagrams for specifically describing operation of modeling a stable score through moment matching according to the present disclosure.
Figure 6:
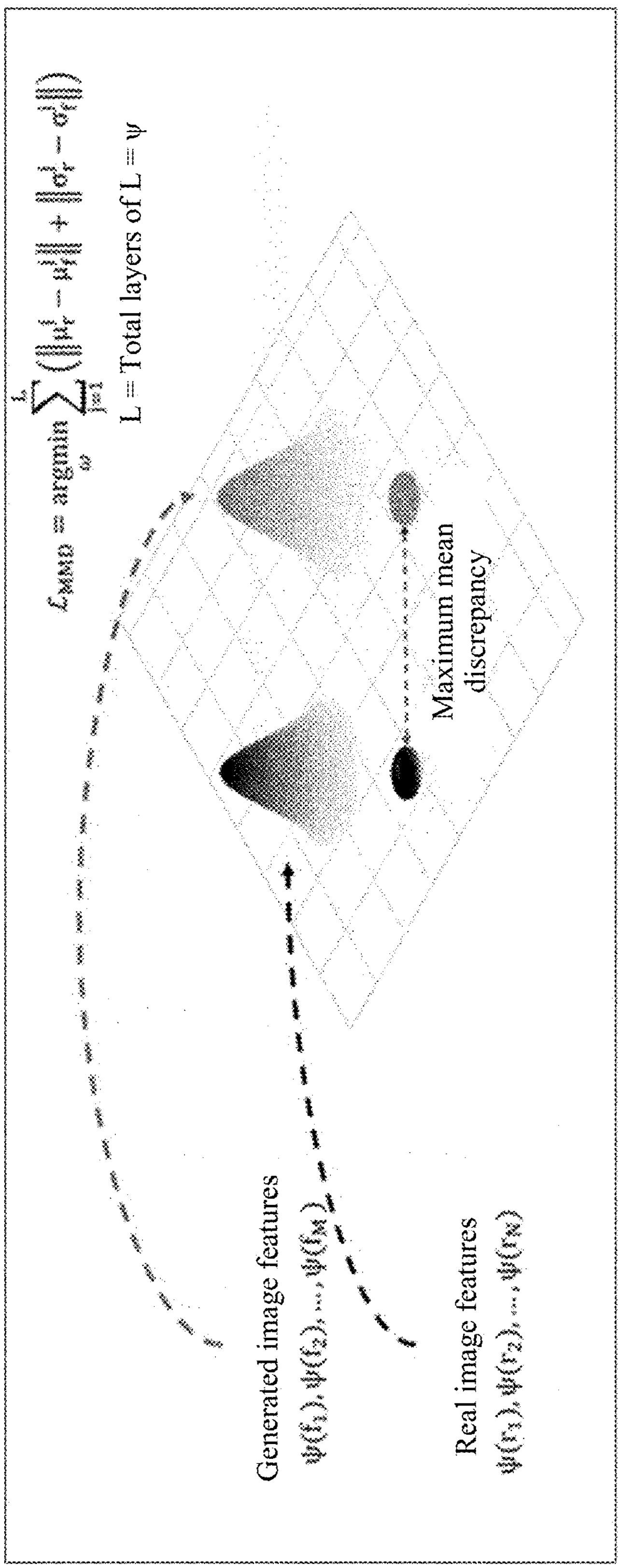

FIGS. 5 and 6 are diagrams for specifically describing operation of modeling a stable score through moment matching according to the present disclosure.

Meanwhile, pruning the generative model may require an appropriate score update function instead of the cross-entropy loss used in the discriminant model. For this purpose, the present disclosure may use Maximum Mean Discrepancy (MMD), which is known to provide stable optimization for training a generative model.

When two sets of real samples $$\{r_t\}_{t=1}^{N}$$

and fake samples $$\{f_t\}_{t=1}^{M}$$

are given, minimizing the MMD loss $L_{MMD}$ may be interpreted as matching all moments of the model distribution with the empirical data distribution. The $L_{MMD}$ may be calculated based on Equation 1 below.

[Equation 1]

$$L_{MMD} = \left\| \frac{1}{N}\sum_{i=1}^{N}\Phi(r_i) - \frac{1}{M}\sum_{j=1}^{M}\Phi(f_j) \right\|^2, \quad (1)$$

$$L_{MMD} = \frac{1}{N^2}\sum_{i=1}^{N}\sum_{i'=1}^{N}\Psi(r_i, r_{i'}) - \frac{2}{NM}\sum_{i=1}^{N}\sum_{j=1}^{M}\Psi(r_i, r_j) + \frac{1}{M^2}\sum_{j=1}^{M}\sum_{j'=1}^{M}\Psi(f_j, f_{j'}), \quad (2)$$

$$L_{MMD} = \sum_{j=1}^{L}\|\mu_r^j - \mu_f^j\|^2 + \|\sigma_r^j - \sigma_f^j\|^2. \quad (3)$$

First, in equation (1), Φ represents a function for matching high-order moments. Ideally, Φ should be calculated with infinite order. To efficiently calculate MMD, the equation (1) is called through a kernel trick.

Additionally, the present disclosure may use a pre-trained VGG network as a fixed kernel ψ, and match the mean and covariance a of real and fake sample features in the VGG embedding space. The reason for this is that, as better performance is achieved as a stronger kernel is used, a trained network (Pre-trained fixed feature extractor) serves as a good kernel, and therefore, the VGG network is used as the fixed kernel ψ.

As a result, the MMD loss is obtained through real data embedded through the VGG network and fake data and the score is updated.

Meanwhile, Iv, wuv, σ, and σ are defined as the input of node "v", the network parameters of node "u" and node "v", the activation function, and the learning rate, respectively. The amount of change in score at time step t may be expressed as Equation 2 below.

[Equation 2]

$$S_t + 1, uv = S_{t,uv} - \alpha\frac{\delta L_{MMD}}{\delta I_v} w_{uv}\sigma(I_u). \quad (4)$$

It is worth noting that the method uses the MMD loss to find nodes with low importance rather than learning weights.

Figure 7:
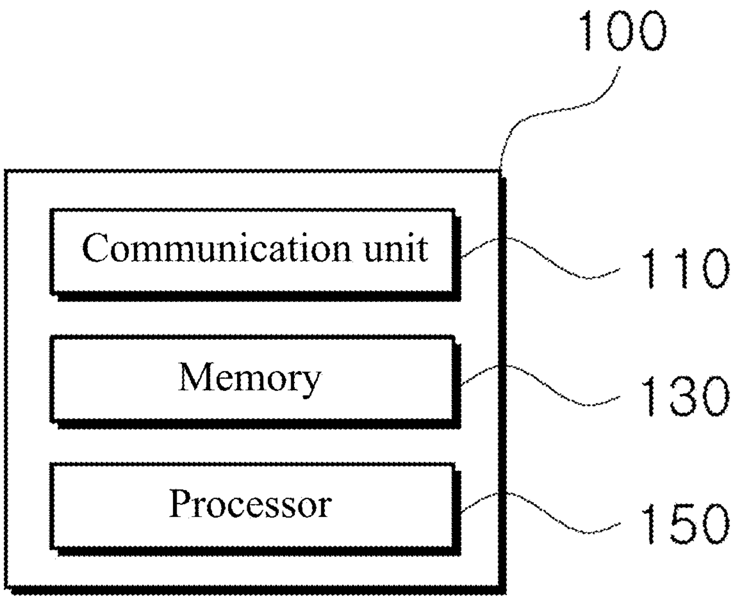
FIG. 7 is a diagram showing the structure of a device that lightens an artificial intelligence-based generative model through a subnetwork according to an embodiment of the present disclosure.

FIG. 7 is a diagram showing the structure of a device that lightens an artificial intelligence-based generative model through a subnetwork according to an embodiment of the present disclosure.

Referring to FIG. 7, a device 100 that lightens an artificial intelligence-based generative model through a subnetwork through a subnetwork (hereinafter referred to as 'lightweight device') according to an embodiment of the present disclosure may include a communication unit 110, a memory 130, and a processor 150.

The communication unit 110 may transmit and receive at least one information or data to at least one device/terminal. The at least one device/terminal may be a device/terminal that is provided with a model obtained by lightening an artificial intelligence-based generative model, or a device/terminal that provides a variety of data/information necessary to make the generation model lightweight, and the type and form of the at least one device/terminal are not limited.

In addition, the communication unit 110 may perform communication with other devices, and transmit and receive wireless signals in a communication network according to wireless Internet technologies.

Examples of wireless Internet technologies include Wireless LAN (WLAN), Wireless-Fidelity (Wi-Fi), Wi-Fi Direct, Digital Living Network Alliance (DLNA), Wireless Broadband (WiBro), WiMAX (World Interoperability for Microwave Access (HSDPA), High Speed Downlink Packet Access (HSDPA), High Speed Uplink Packet Access (HSUPA), Long Term Evolution (LTE), and Long Term Evolution-Advanced (LTE-A), or the like, and the lightweight device 100 may transmits/receive data according to at least one wireless Internet technology within a range including Internet technologies not listed above.

The communication unit 110 may support short-range communication using at least one of Bluetooth™, Radio Frequency Identification (RFID), Infrared Data Association (IrDA), Ultra-Wideband (UWB), ZigBee, Near Field Communication (NFC), Wi-Fi (Wireless-Fidelity), Wi-Fi Direct, and Wireless USB (Wireless Universal Serial Bus) technologies. Such wireless area networks may support wireless communication between the lightweight device 100 and at least one user terminal (not shown). In this case, the wireless area networks may be wireless personal area networks.

The memory 130 may store at least one process (algorithm) for lightening and providing an artificial intelligence-based generative model through a subnetwork or data about a program that reproduces the process. In addition, the memory 130 may further store, but is not limited to, processes for performing other operations.

The memory 130 may store various information/data necessary to lighten and provide an artificial intelligence-based generative model through a subnetwork, as well as various other data supporting various functions of the lightweight device 100. The memory 130 may store a plurality of application programs (or applications) running on the lightweight device 100, and data and instructions for operation of the lightweight device 100. At least some of these application programs may be downloaded from an external server through wireless communication. Meanwhile, the application programs may be stored in the memory 130, installed on the lightweight device 100, and driven to perform an operation (or function) based on data stored in the memory 130 through the processor 150.

Also, the memory 130 may include at least one type of storage medium among a flash memory type, a hard disk type, a multimedia card micro type, a card type memory (e.g., SD or XD memory), random access memory (RAM), static random access memory (SRAM), read-only memory (ROM), electrically erasable programmable read-only memory (EEPROM), programmable read-only memory (PROM), magnetic memory, magnetic disk, and optical disk. In addition, the memory may temporarily, permanently, or semi-permanently store information, and may be provided as a built-in or removable type.

In addition, the memory 130 may build a database that stores a variety of information necessary to lighten and provide an artificial intelligence-based generative model through a subnetwork, or may be linked to a separate external server (including a cloud server).

Meanwhile, in addition to operations related to the application program, the processor 150 may control all components within the lightweight device 100 to process input or output signals, data, information, or the like, execute instructions, algorithms, and applications stored in at least one memory to perform various processes, and provide and process appropriate information or functions to lightweight and provide an artificial intelligence-based generative model through a subnetwork.

Specifically, the processor 150 may assign a randomly-initialized score "s" to each of weights for the dense network based on the edge-popup algorithm, find a random subnetwork, and then sort the assigned scores in each forward path. After sorting, the processor 150 may update the scores using backpropagation while leaving a weight with a preset top k % score.

In this case, the processor 150 may set other weights to 0 while leaving the weight with the preset top k % score, and in the reverse path, calculate the loss of the subnetwork to utilize backpropagation.

Meanwhile, when calculating the loss of the subnetwork, the processor 150 may send an image generated through the subnetwork and a real image to the embedding space to calculate the Maximum Mean Discrepancy (MMD) score.

In this case, the processor 150 may calculate the Maximum Mean Discrepancy by matching moments of all orders with the real samples $$\{r_t\}_{t=1}^{N}$$

and fake samples $$\{f_t\}_{t=1}^{M}$$

as two sample sets.

Specifically, as described above, the maximum mean discrepancy may be calculated based on [Equation 1] above.

Figure 8:
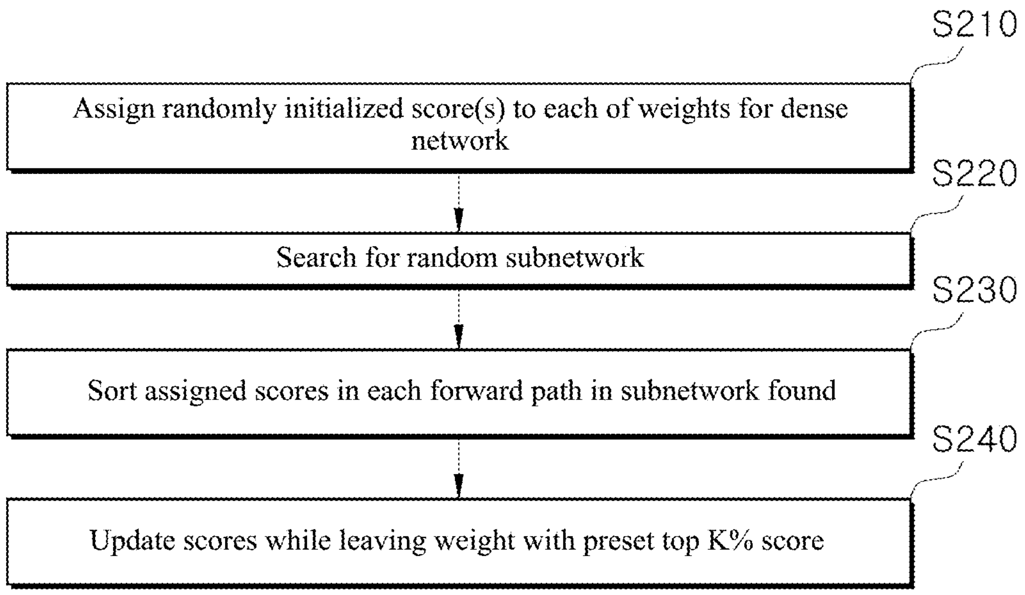
FIG. 8 is a diagram showing a method of lightening an artificial intelligence-based generative model through a subnetwork according to an embodiment of the present disclosure.

FIG. 8 is a diagram showing a method of lightening an artificial intelligence-based generative model through a subnetwork according to an embodiment of the present disclosure.

Referring to FIG. 8, the lightweight device 100 may assign a randomly initialized score(s) to each of weights for a dense network based on the edge-popup algorithm (S210) and find (search for) a random subnetwork. (S220).

Next, the lightweight device 100 may sort the assigned scores in each forward path in the subnetwork found in step S220 (S230), and update the scores using backpropagation while leaving a weight with the preset top k % score, (S240).

Figure 9:
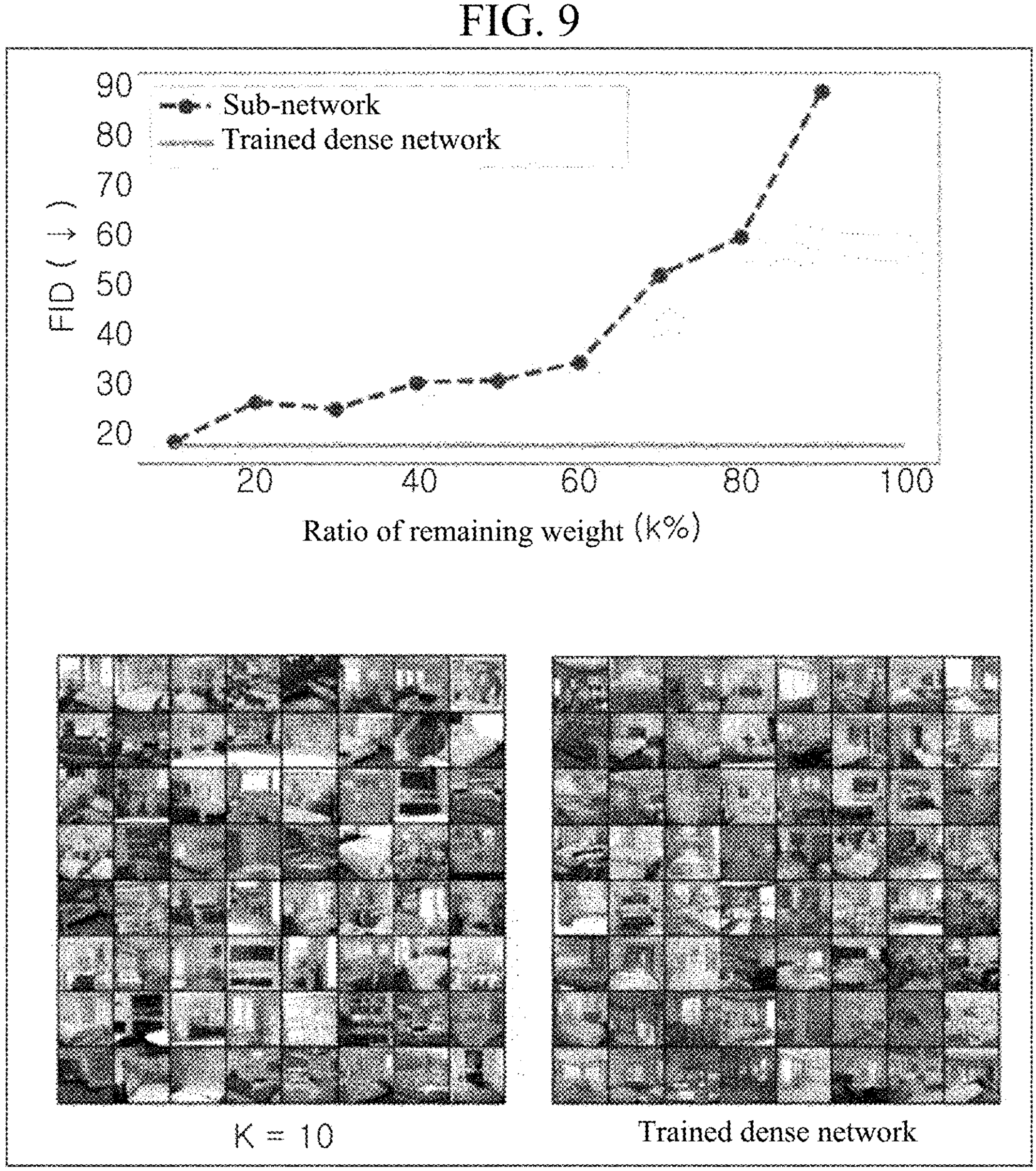
FIG. 9 is a diagram showing an example of the results of an experiment conducted to identify whether SLTs exist in a generative model according to the present disclosure.

FIG. 9 is a diagram showing an example of the results of an experiment conducted to identify whether SLTs exist in a generative model according to the present disclosure, which shows an example of comparing the FID scores of the subnetwork and the trained dense network (GFMN; LSUN-Bedroom).

Referring to FIG. 9, when pruning a randomly initialized neural network without weight updates, here, FIDs are visualized for various "K", which is the ratio (%) of the remaining weights of the pruned subnetwork.

In this case, the server network is obtained while changing the ratio of the remaining weights, that is, how many weights are left, and its performance is shown. The FID score is an indicator of the performance of the generative model, and the better the indicator as the lower the value of the indicator.

In FIG. 9, the solid line represents the performance of the trained model, and the dotted line represents a change in performance of the subnetwork according to the amount of weight (K) left by applying a corresponding algorithm to the random network. It can be seen that the smaller "K", the better the performance. At points where "K" is high, poor performance is shown, which is a natural phenomenon because the higher k is, the closer it is to a random dense network. On the other hand, as "K" decreases, the performance of the generative model improves, and it can be seen that the performance of the subnetwork overlaps the trained dense network when "K" reaches 10%.

As a result, those points may be considered as SLTs.

Meanwhile, in the present disclosure, inference is performed for a predetermined purpose using a model implemented in an artificial neural network method. Hereinafter, the artificial neural network will be described.

A model according to the present disclosure may refer to any type of computer program that operates based on a network function, an artificial neural network, and/or a neural network. Throughout this specification, the model, the neural network, the network function, and the neural network may be used interchangeably. In a neural network, one or more nodes are interconnected via one or more links to form a relationship between an input node and output node within the neural network. The characteristics of the neural network may be determined according to the number of nodes and links within the neural network, the relationship between the nodes and links, and the value of a weight assigned to each link. The neural network may consist of a set of one or more nodes. A subset of nodes constituting the neural network may constitute a layer.

A deep neural network (DNN) may refer to a neural network that includes a plurality of hidden layers in addition to an input layer and an output layer, and the number of the hidden layers in the middle is one or more or preferably two or more in the deep neural network.

The deep neural network may include a convolutional neural network (CNN), a vision transformer, a recurrent neural network (RNN), a Long Short Term Memory (LSTM) network, a Generative Pre-trained transformer (GPT), an auto encoder, a Generative Adversarial Network, a restricted Boltzmann machine (RBM), a deep belief network (DBN), a Q network, a U network, a Siamese network, a Generative Adversarial Network, a transformer, or the like.

Alternatively, according to the embodiment, the deep neural network may be a model trained using transfer learning. Here, transfer learning may refer to a learning method of pre-training a large amount of unlabeled learning data using a semi-supervised learning or self-learning method to obtain a pre-trained model (or a base unit) with a first task through techniques (MLM and NSP) and performing training with the labeled training data in a supervised learning method for fine-tuning of the pre-trained model to be suitable for a second task to implement a targeted model. One of models trained using this transfer learning method may be a BERT (Bidirectional Encoder Representations from Transformers), but the present disclosure is not limited thereto.

The description of the deep neural network described above is only an example and the present disclosure is not limited thereto. The convolutional neural network described above may consist of a feature extraction unit (feature learning) that extracts features from an image, and a classification unit that performs classification using the extracted features. The feature extraction unit may include, but is not limited to, a convolution layer in which features are extracted from an image using a kernel, a ReLU layer as one of activation functions, and a pooling layer to reduce the dimensions of data. In addition, the classification unit may include, but is not limited to, a flatten layer that lines up features extracted by the feature extraction unit, a fully connected layer where classification is actually performed, and a softmax function.

The neural network may be trained in at least one of supervised learning, unsupervised learning, semi-supervised learning, self-supervised learning, or reinforcement learning. Learning of the neural network may be a process of applying knowledge for the neural network to perform a specific operation to the neural network.

The neural network may be trained to minimize output errors. When the neural network is trained, training data is repeatedly input into the neural network, the output of the neural network and the error of the target for the training data are calculated, and the error of the neural network is back propagated from the output layer of the neural network to the input layer in the direction of reducing the error to update the weight of each node of the neural network. In the case of supervised learning, data (labeled data) in which a correct answer is labeled for each training data may be used, and in the case of unsupervised learning, data (unlabeled data) in which a correct answer is not labeled for each learning data may be used. The amount of change in a weight for the connection of each updated node may be determined according to a learning rate. The neural network's calculation of input data and backpropagation of errors may constitute a learning cycle (epoch). The learning rate may be applied differently depending on the number of repetitions of the learning cycle of the neural network. Additionally, to prevent overfitting, methods such as increasing learning data, regularization, dropout to disable some nodes, and batch normalization layer may be applied.

Meanwhile, the model disclosed in an embodiment may employ at least part of a transformer. The transformer may be composed of an encoder that encodes embedded data and a decoder that decodes the encoded data. The transformer may have a structure that receives a set of data, passes the data through encoding and decoding and outputs a set of data of different types. In one embodiment, the set of data may be processed into a form which the transformer is able to operate. The process of processing the set of data into the form which the transformer is able to operate may include an embedding process. Expressions such as data token, embedding vector, embedding token, and the like may refer to data embedded in forms which the transformer is able to process.

In order for the transformer to encode and decode the set of data, the encoders and decoders within the transformer may perform processing using an attention algorithm. The attention algorithm may refer an algorithm that calculates the similarity of one or more keys for a given query, reflects the similarity in a value corresponding to each key, and calculates an attention value by weighting the values reflecting the similarity.

Depending on how queries, keys, and values are set, various types of attention algorithms may be classified. For example, when attention is obtained by setting all the query, key, and value in the same manner, this may refer to a self-attention algorithm. In order to process a set of input data in parallel, when the dimension of the embedding vector is reduced and attention is obtained by obtaining individual attention heads for each divided embedding vector, this may refer to a multi-head attention algorithm.

In one embodiment, the transformer may be composed of modules that perform a plurality of multi-head self-attention algorithms or multi-head encoder-decoder algorithms. In one embodiment, the transformer may also include additional components other than the attention algorithm, such as embedding, normalization, and softmax. A method of configuring a transformer using an attention algorithm may include the method disclosed in Vaswani et al., Attention Is All You Need, 2017 NIPS, which is incorporated herein by reference.

The transformers may convert a set of input data into a set of output data by applying the set of input data to various data domains such as embedded natural language, segmented image data, audio waveforms and the like. In order to convert data with various data domains into a set of data capable of being input to the transformer, the transformer may embed the data. The transformers may process additional data expressing relative positional or phase relationships between a set of input data. Alternatively, a set of input data may be embedded by additionally reflecting vectors expressing relative positional relationships or phase relationships between the input data in the input data In one example, the relative positional relationship between the set of input data may include, but is not limited to, word order within a natural language sentence, the relative positional relationship of each segmented image, temporal order of segmented audio waveforms, or the like. The process of adding information expressing the relative positional or phase relationships between the set of input data may be referred to as positional encoding.

The above-described program may include codes coded in a computer language, such as C, C++, JAVA, or a machine language, which are readable by a processor (CPU) of the computer through a device interface of the computer such that the computer reads the program and execute the methods implemented by the program. The codes may include functional codes associated with a function defining functions necessary to execute the methods or the like, and include control codes associated with an execution procedure necessary for the processor of the computer to execute the functions according to a predetermined procedure. In addition, the codes may further include memory reference codes indicating at which location (address number) of the computer's internal or external memory, additional information or media required for the computer's processor to execute the functions can be referenced. In addition, when the processor of the computer needs to communicate with any other computer or server located remotely to execute the above functions, codes may further include communication-related codes for how to communicate with any other remote computer or server using a communication module of the computer, and what information or media to transmit/receive during communication.

The storage medium refers to a medium that stores data semi-permanently rather than a medium storing data for a very short time, such as a register, a cache, and a memory, and is readable by an apparatus. Specifically, examples of the storage medium may include, but are not limited to, a ROM, a RAM, a CD-ROM, a magnetic tape, a floppy disk, an optical data storage device, and the like. That is, the program may be stored in various recording media on various servers to which the computer can access or various recording media on the computer of a user. The medium may also be distributed to a computer system connected thereto through a network and store computer readable codes in a distributed manner.

The steps of a method or algorithm described in connection with the embodiments of the present disclosure may be implemented directly in hardware, in a software module executed by hardware, or in a combination thereof. The software module may reside in a random access memory (RAM), a read only memory (ROM), an erasable programmable ROM (EPROM), an electrically erasable programmable ROM (EEPROM), a flash memory, a hard disk, a removable disk, a CD-ROM, or in a computer readable recording medium that is well known in the art.

Although embodiments of the present disclosure have been described above with reference to the accompanying drawings, it is understood that those skilled in the art to which the present disclosure pertains may implement the present disclosure in other specific forms without changing the technical spirit or essential features thereof. Therefore, it should be understood that the embodiments described above are illustrative in all respects and not restrictive.

According to the embodiments of the present disclosure, it is possible to stably compress the generative model and lighten the generative model without degrading performance by using a subnetwork (strong lottery tickets, SLTs) algorithm for reliably finding the same network as a trained generative model among subnetworks.

However, effects of the present disclosure may not be limited to the above-described effects. Although not described herein, other effects of the present disclosure can be clearly understood by those skilled in the art from the following description.

While the present disclosure has been described with reference to embodiments, it will be apparent to those skilled in the art that various changes and modifications may be made without departing from the spirit and scope of the present disclosure. Therefore, it should be understood that the above embodiments are not limiting, but illustrative.

What is claimed is:

1. A device for lightening an artificial intelligence-based generative model comprising:

a memory configured to store data for lightening the artificial intelligence-based generative model; and a processor configured to perform operations related to lightening of the generative model, wherein the processor is configured to assign a randomly initialized score(s) to each of weights for a dense network based on an edge-popup algorithm, find a random subnetwork, sort the assigned scores in each forward path, and update the scores using backpropagation, while leaving a weight with a preset top k % score, and wherein the processor is configured to send an image generated through the subnetwork and a real image to an embedding space to calculate a Maximum Mean Discrepancy (MMD) score when calculating a loss of the subnetwork.

2. The device of claim 1, wherein the processor is configured to set other weights to zero while leaving the weight with the preset top k % score, and in a reverse path, calculate a loss of the subnetwork and utilize the backpropagation.

3. The device of claim 1, wherein the processor is configured to calculate the MMD score by matching moments of all orders with real samples and fake samples as two sample sets.

4. The device of claim 3, wherein the MMD score is calculated based on <Equation 1> below

[Equation 1]

$$L_{MMD} = \left\| \frac{1}{N}\sum_{i=1}^{N} \middle| \Phi(r_i) - \frac{1}{M}\sum_{j=1}^{M} \Phi(f_j) \right\|^2 \ldots \bigg|$$

where $r_i$ represents the real sample and $f_j$ represents the fake sample.

5. The device of claim 3, wherein the processor is configured to use, as a kernel, a VGG network pre-trained for the moment matching.

6. The device of claim 5, wherein the processor is configured to find Strong Lottery Tickets (SLTs) by repeatedly performing an operation of updating the MMD score.

7. The device of claim 1, further comprising:

a communication unit electrically connected to the processor, and configured to perform communication with an external device that provides data for lightening the generative model.

8. A method for lightening an artificial intelligence-based generative model, the method being performed by a device, the method comprising:

assigning a randomly initialized score(s) to each of weights for a dense network based on an edge-popup algorithm;

finding a random subnetwork;

sorting the assigned scores in each forward path; and updating the scores using backpropagation, while leaving a weight with a preset top k % score, and wherein the updating includes sending an image generated through the subnetwork and a real image to an embedding space to calculating a Maximum Mean Discrepancy (MMD) score when calculating a loss of the subnetwork.

9. The method of claim 8, wherein the updating includes setting other weights to zero while leaving the weight with the preset top k % score, and in a reverse path, calculating a loss of the subnetwork and utilizing the backpropagation.

10. The method of claim 8, wherein the updating includes calculating the MMD score by matching moments of all orders with real samples and fake samples as two sample sets.

11. The method of claim 10, wherein the MMD score is calculated based on <Equation 1> below

[Equation 1]

$$L_{MMD} = \left\| \frac{1}{N}\sum_{i=1}^{N} \middle| \Phi(r_i) - \frac{1}{M}\sum_{j=1}^{M} \Phi(f_j) \right\|^2 \ldots \bigg|$$

where $r_i$ represents the real sample and $f_j$ represents the fake sample.

12. The method of claim 10, wherein the updating includes using, as a kernel, a VGG network pre-trained for the moment matching.

13. The method of claim 12, wherein the updating includes finding Strong Lottery Tickets (SLTs) by repeatedly performing an operation of updating the MMD score.

* * * * *